United States Patent [19]

Gould et al.

[11] 4,142,173

[45] Feb. 27, 1979

[54] MOUNTING BRACKET ASSEMBLY FOR TRAFFIC SIGNALS AND PEDESTRIAN SIGNAL UNITS

[75] Inventors: James S. Gould, Los Alamitos; Samuel Gould, San Pedro, both of Calif.

[73] Assignee: Indicator Controls Corporation, Gardena, Calif.

[21] Appl. No.: 766,612

[22] Filed: Feb. 7, 1977

[51] Int. Cl.² .......................... E01F 9/01; F21S 1/10; F16L 43/00

[52] U.S. Cl. .......................... 340/119; 174/65 R; 174/81; 248/214; 285/127; 339/122 F; 339/22 R

[58] Field of Search .................... 340/119; 339/22, 24, 339/122 F, 263-265; 285/125-129, 406, 156, 412, 150; 174/81 R, 68 C, 65 R; 240/52 R, 73 QD; 248/214, 230

[56] References Cited

U.S. PATENT DOCUMENTS

| | | | |
|---|---|---|---|
| 1,170,690 | 2/1916 | Skeel | 339/122 F |
| 1,700,983 | 2/1929 | Hooley | 285/127 |
| 2,970,289 | 1/1961 | Loomis | 340/119 X |
| 3,020,332 | 2/1962 | Appleton | 174/81 X |
| 3,586,280 | 6/1971 | Parduhn | 340/119 X |
| 3,624,269 | 11/1971 | Latta | 340/119 X |

FOREIGN PATENT DOCUMENTS 1441542 10/1964 Fed. Rep. of Germany .......... 340/119

*Primary Examiner*—Donald J. Yusko
*Attorney, Agent, or Firm*—Keith D. Beecher

[57] ABSTRACT

A combined elongated terminal box and a mounting bracket is provided for pedestrian and traffic signal units for mounting traffic signals, and either one or two pedestrian signal units on an upright pole. The bracket is mounted to the pole to extend radially outwardly from the pole on one side of the longitudinal axis thereof when a signal unit is to be mounted on the pole, and to extend on both sides of the longitudinal axis of the pole when two pedestrian signal units are to be mounted on the pole. The bracket has a tubular protuberance at the distal end thereof which extends perpendicularly to the longitudinal axis of the bracket and into a mounting hole in the top edge of the signal unit to be supported by the bracket. The energizing electric wires for the unit are brought up through the interior of the pole and through a bushing into the interior of the bracket to a terminal strip which is mounted in a housing formed by the bracket. The terminal strip, in turn, is connected to electric wires extending through the tubular protuberance and into the signal unit to energize the illuminating elements therein. A similar bracket may be provided to be attached to the bottom edge of the pedestrian signal unit.

8 Claims, 5 Drawing Figures

MOUNTING BRACKET ASSEMBLY FOR TRAFFIC SIGNALS AND PEDESTRIAN SIGNAL UNITS

BACKGROUND OF THE INVENTION

Pedestrian signal units are presently in widespread use. Most pedestrian signal units are of the type which include a rectangular housing, and a face plate mounted on the housing which has an upper portion bearing the legend "DONT" and a lower portion bearing the legend "WALK". Pedestrian signal units are usually located at pedestrian crosswalks, and they indicate to the pedestrians that they may cross the crosswalk when the lower portion of the face plate is illuminated to exhibit the word "WALK", but that they may not cross the crosswalk when both the upper and lower portions are illuminated to exhibit the words "DONT WALK".

For years traffic signals and pedestrian signal units have been mounted on upright poles by a complex assembly of pipes and electric terminal boxes which are not only heavy and expensive, but which make the installation of the signal units on the poles a difficult and arduous task.

The mounting bracket of the present invention represents a simple and economical means for mounting traffic signals and one or two pedestrian signal units on an upright pole. The bracket is simple and inexpensive, yet it is rugged and strong. The bracket permits the pedestrian signal unit to be mounted on the pole in a simple and more economical manner than the prior art mounting arrangements; and it also defines a housing for an electrical terminal strip, which permits the electrically energized illuminating elements in the unit to be connected to the electric wires which extend from an electrical energizing and controlling source up through the interior of the upright supporting pole.

DETAILED DESCRIPTION OF THE ILLUSTRATED EMBODIMENTS

Figure 1:
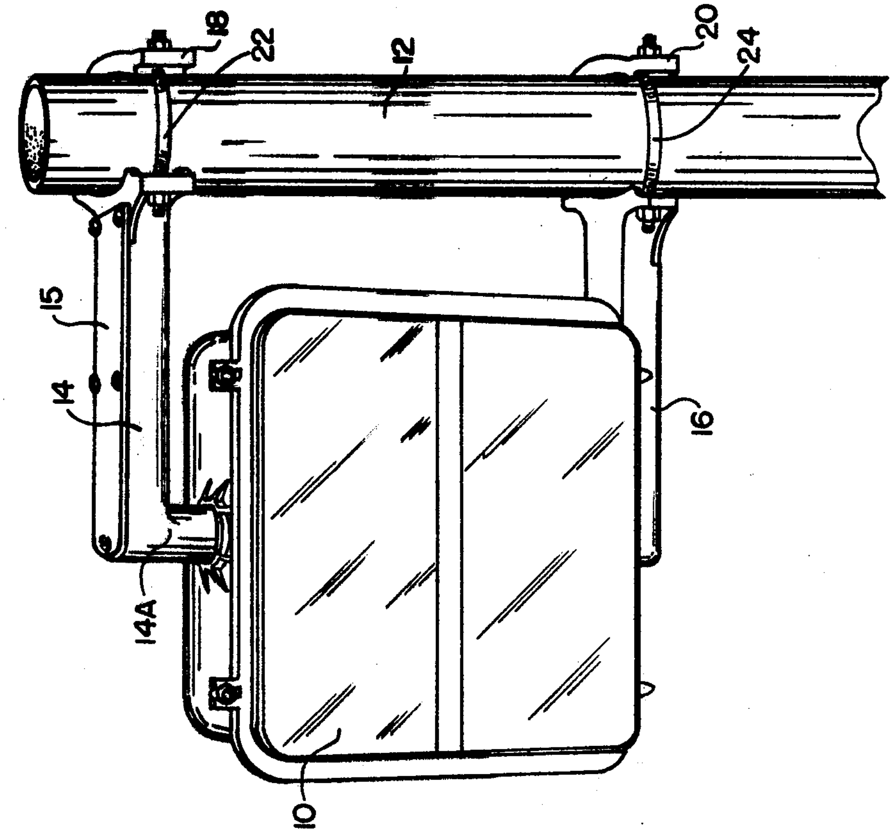
FIG. 1 is a perspective view, taken from the front and slightly above the pedestrian signal unit mounted on an upright pole by a pair of brackets representing one embodiment of the invention.

As shown in FIG. 1, a rectangular-shaped pedestrian signal unit 10 is mounted on a hollow upright supporting pole 12 by a pair of elongated brackets 14 and 16. The elongated brackets 14 and 16 each have an integral protuberance, such as protuberance **14*a*** at the distal ends thereof, and these protuberances extend into mounting holes in the upper and lower edges of the signal unit, and are attached to the unit by appropriate fastening means.

The brackets 14 and 16 are supported on the pole 21 by shoes, such as shoes 18 and 20, and by bolts, such as bolts 22 and 24 which extend between the ends of the brackets and the shoes. In the illustrated embodiment the bolts 22 and 24 have an arcuate configuration to extend partially around the peripheral surface of the pole. The illustrated configuration of the bolts is advantageous in that it permits the signal unit to be turned around the axis of the pole to square it with the crosswalk before the bolts are tightened.

Figure 2:
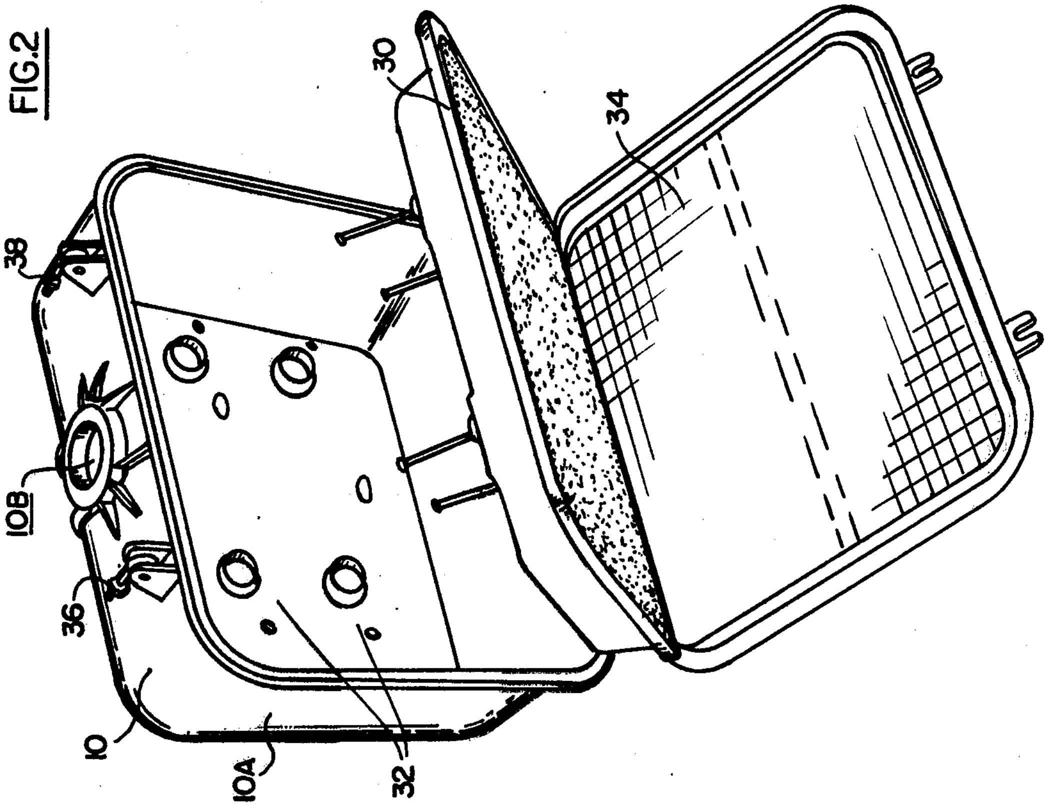
FIG. 2 is a perspective representation of the pedestrian signal unit of FIG. 1 in an open condition to reveal the internal components of the unit.

The signal 10 may have the structural configuration shown in FIG. 2. It includes a rectangular housing **10*a* having mounting holes, such as the mount hole 10*b* in its top and bottom edges. The unit also includes a plug-in module 30 which plugs into appropriate sockets in a pair of transformers 32 mounted within the housing 10*a*. A door frame 34 is hinged to the lower edge of the housing, and is equipped with an appropriate visor. The door frame 34 is held in place across the front of the housing 10*a* by a pair of shackle bolts 36 and 38**.

Figure 3:
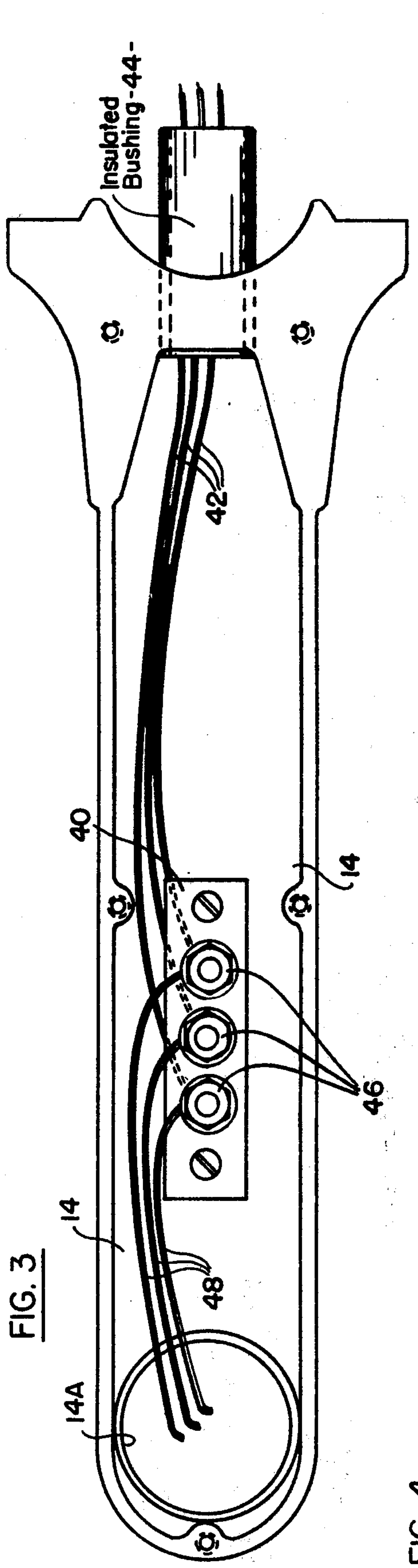
FIG. 3 is a top view of the bracket of FIG. 1 with the cover removed to reveal a terminal strip and interconnecting wires which are contained within a housing formed by the bracket.

To mount the unit on the upright pole 12, it is merely necessary to place the unit alongside the pole, and then secure the ends of brackets 14 and 16 to the pole by the elements described above. The wires 42 from the interior of the pole are then brought through an insulated bushing 44 (FIG. 3) and connected to terminals 46 on a terminal board 41 so that connections may be made through protuberance **14*a* by wires 48 to the illuminating elements within the unit. The cover 15 (FIG. 1) is then secured in place. An appropriate gasket is provided between the cover and bracket 14** to assure that the interior of the housing formed by the bracket will be watertight.

Figure 4:
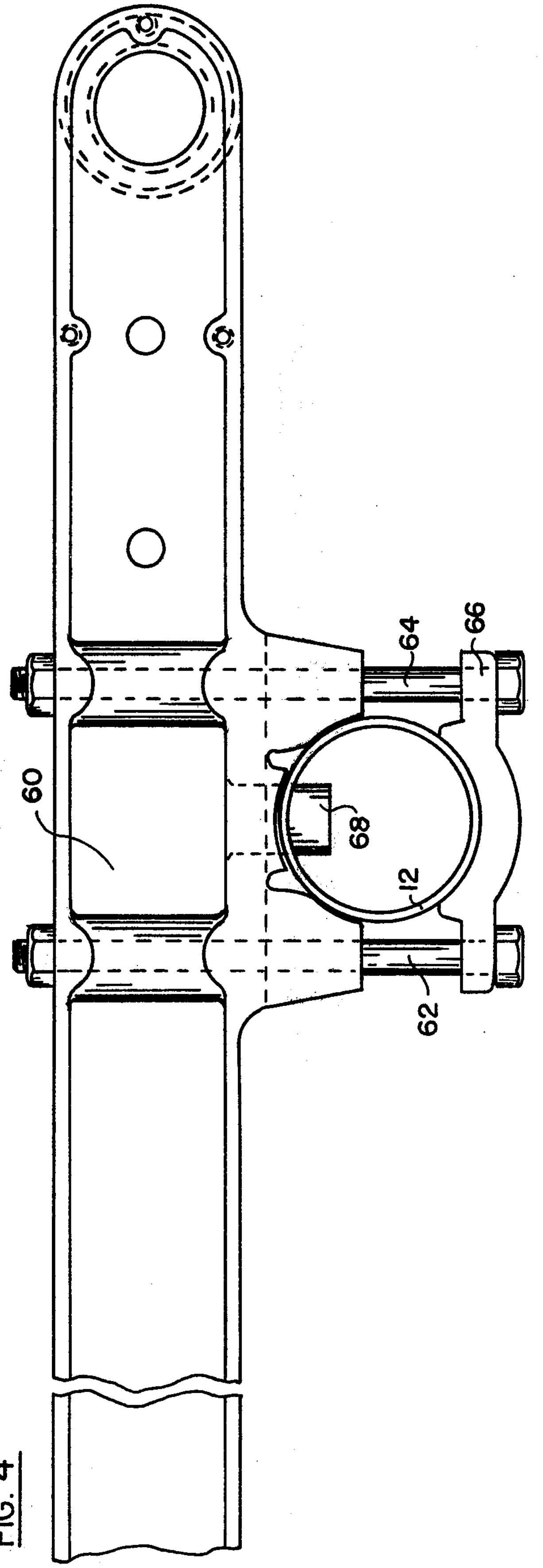
FIG. 4 is a top plan view of a second embodiment of the invention in which the elongated mounting bracket extends radially on both sides of the longitudinal axis of the supporting pole to mount a pedestrian traffic signal unit at each end of the bracket.
Figure 5:
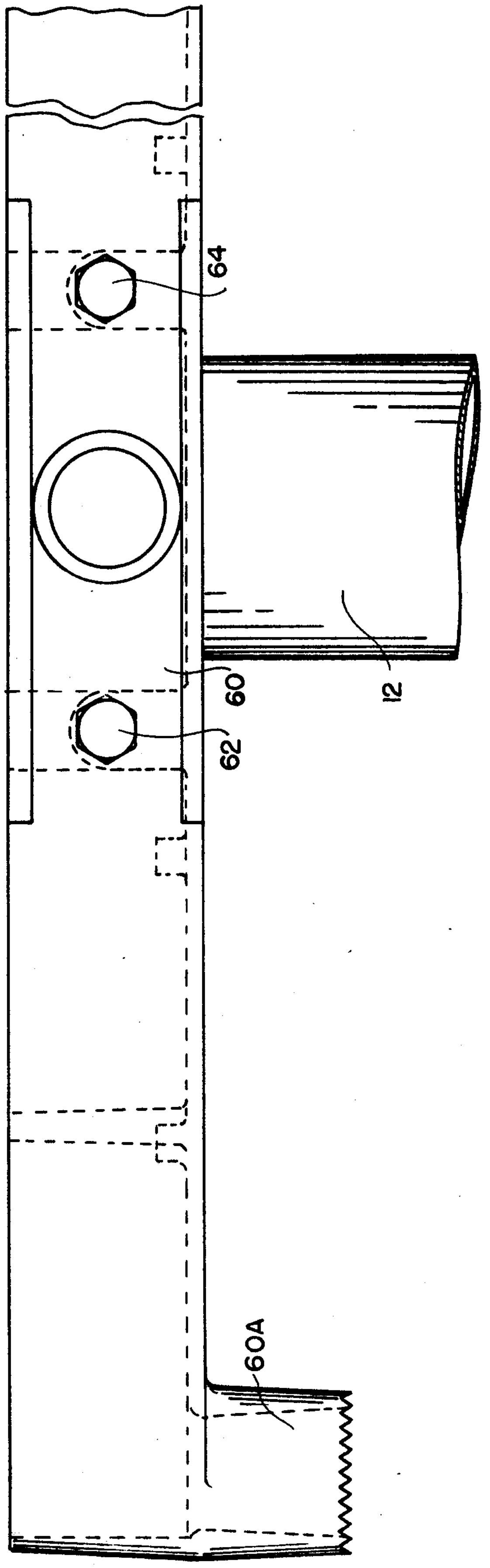
FIG. 5 is an elevational view of the bracket of FIG. 4.

In the embodiment of FIGS. 4 and 5, a single bracket 60 is provided which is secured to the pole 12 by bolts 62 and 64 which extend through the bracket and through a shoe 66 on the opposite side of the pole. The bracket has an insulated intermediate bushing 68 which extends through the hole in the pole 12. The bracket 60 defines a housing on each side of the pole, similar to the housing shown in FIG. 3, and a separate pedestrian signal unit may be supported on each end of the bracket.

As shown in FIG. 5, bracket 60 has a tubular protuberance at each end thereof, such as the protuberance **60*a*, which extend into the mounting holes 10*b* (FIG. 2**) of each signal unit supported at the ends of the bracket.

While particular embodiments of the invention have been shown and described, modifications may be made. It is intended in the claims to cover the modifications which come within the spirit and scope of the invention.

What is claimed is:

1. In combination: an upright pole; a rectangular-shaped pedestrian traffic signal unit having a mounting hole in an edge thereof; an elongated mounting bracket having a tubular protuberance at one end thereof extending perpendicularly to the longitudinal axis of the bracket and into said mounting hole to mount the signal unit to the bracket, said bracket having an opening therein at the other end thereof for receiving electric wires from the interior of the pole, and said bracket defining a housing; means mounting the bracket on the pole to extend radially outwardly thereform and with said opening therein adjacent to a hole in the pole; and a terminal strip mounted in the housing defined by the bracket and connected to the wires extending from the interior of the pole into the housing through said opening therein and through the hole in the pole, and said terminal strip being connected to wires extending through said protuberance and through said mounting hole into the unit and connected to electrically energized illuminating elements therein.

2. The combination defined in claim 1, in which said mounting hold is located in the upper edge of said traffic signal unit, and in which said elongated bracket is disposed above the signal unit.

3. The combination defined in claim 2, in which said signal unit has a second mounting hole in the lower edge thereof, and which includes a second elongated mounting bracket having a tubular protuberance at one end thereof extending perpendicular to the longitunal axis of the second-named bracket and into the second-named mounting hole to mount the signal unit to the second bracket, and which includes second means mounting the second bracket on the pole to extend radially outwardly therefrom under the signal unit.

4. The combination defined in claim 1, and which includes an insulating bushing extending through the opening in the other end of the bracket and into the hole in the pole for receiving the wires from the interior of the pole.

5. The combination defined in claim 1, in which the bracket has an open top, and which includes a removable cover for enclosing said open top.

6. The combination defined in claim 1, in which the bracket extends radially on both sides of the longitudinal axis of the pole in perpendicular relationship therewith to support a pedestrian traffic signal unit at each end of the bracket.

7. The combination defined in claim 1, in which said mounting means comprises a shoe positioned on the pole diametrically opposite to said bracket, and a pair of bolts extending between the bracket and the shoe.

8. The combination defined in claim 7, in which the bolts have an arcuate shape to extend partially around the periphery of the pole.

* * * * *